CONTROL CIRCUIT FOR MEMORY
Filed Oct. 31, 1967
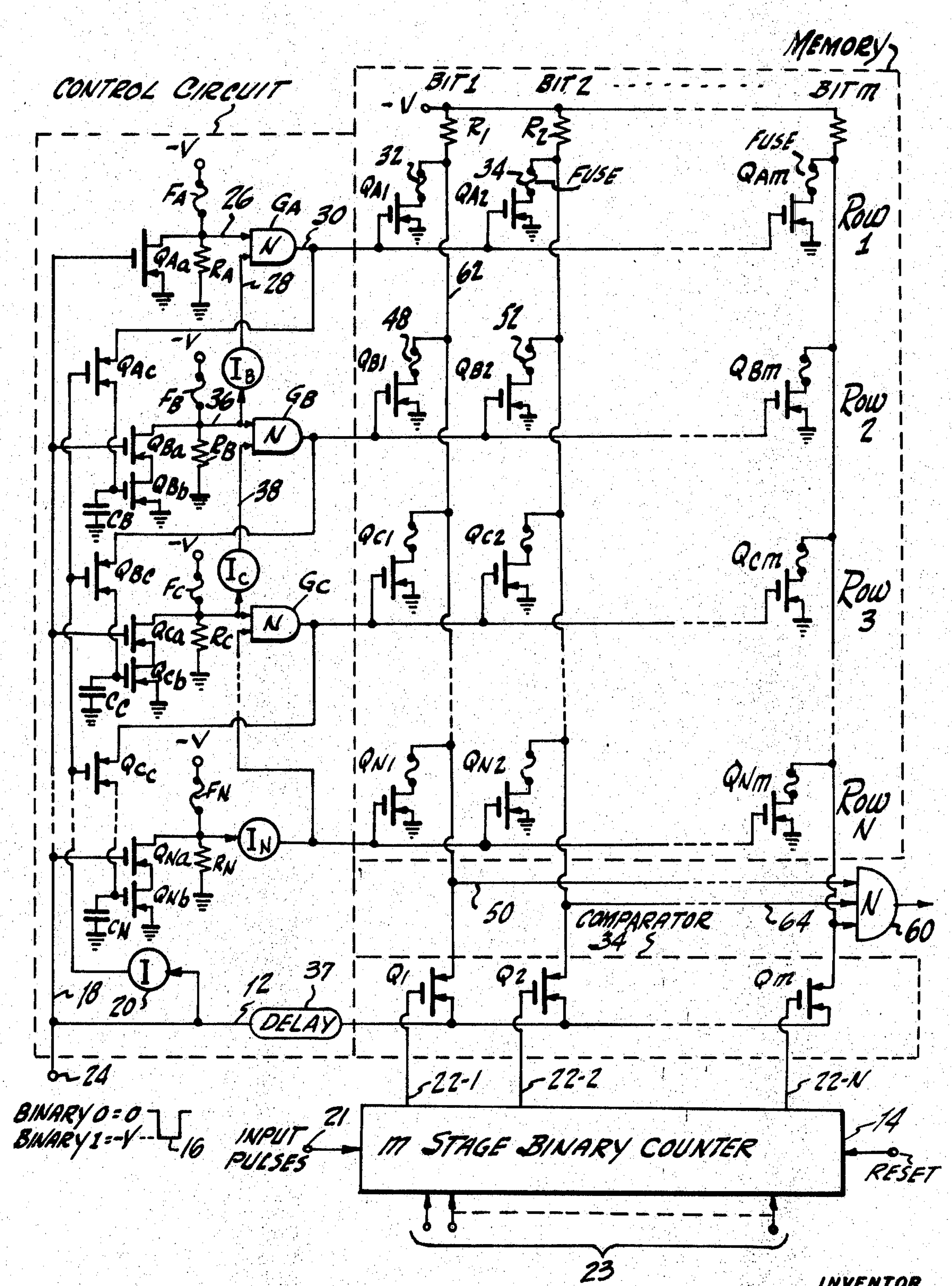
INVENTOR
Adolph Karl Rapp
BY [signature]
ATTORNEY 3,533,088
CONTROL CIRCUIT FOR MEMORY
Adolph Karl Rapp, Princeton, N.J., assignor to RCA Corporation, a corporation of Delaware
Filed Oct. 31, 1967, Ser. No. 679,460
Int. Cl. G11c *7/00, 11/40, 17/00*
U.S. Cl. 340—173 8 Claims

ABSTRACT OF THE DISCLOSURE

A control circuit, in response to successive commands, permits successive binary words to be stored in successive rows of a memory. Additional information is prevented from being written into a row after a write-in command has been terminated. The last row of information written automatically may be read in response to a read-out command.

Background of the invention

There is a requirement in a particular application, for a memory circuit which is small, light and trouble-free, which can store information for a long period of time and which consumes no power during this long period of time. One type of memory which meets these requirements employs fusible links (fuses), which may be integrated circuit elements, as the storage elements and other circuit elements, such as metal oxide semiconductor (MOS) devices which also can be integrated. The present invention relates to a control circuit for such a memory, which control circuit also can be integrated and which permits information electronically to be written into and read out of the memory.

Summary of the invention

The control circuit of the invention includes a plurality of logic stages, one such stage per row of the memory. Each such logic stage normally disables the row of the memory to which it is connected. In response to a write command, a logic stage of the control circuit becomes enabled and permits a row of information to be written into the memory. In a preferred form of the invention, a disabled row is enabled by burning out a fuse in the logic stage for that row and the burned-out fuse causes the logic stage for the previous row of the memory to become disabled, thereby preventing any further write-in to that previous row. In one form of the invention, the control circuit permits the last row of information written automatically to be read out in response to a read-out command.

Brief Description of the Drawing

The sole figure is a circuit diagram of a preferred form of the present invention.

Detailed Description

The memory shown in the figure has *m* columns and N rows. Each memory location comprises a P-type fieild-effect transistor of the MOS type and a fuse. The source electrode of each transistor is connected to ground, the gate electrode is connected to a row conductor and the drain electrode is connected through a fuse to a column conductor. Each column conductor is terminated at one end by a resistor such as resistor $R_2$ which is connected between the column conductor and a terminal to which a source of negative voltage —V may be applied. The various circuit elements, transistors, conductors, fuses and resistors making up the memory (and also the other circuits shown) may be laid down by integrated circuit techniques. Further, the resistors shown in the figure, in practice, may be MOS transistors to the gate electrodes of which a fixed potential is applied.

The control circuit for the memory is shown at the left. It includes a plurality of circuit elements for each row. As these elements are similar for the rows following the first row, only two such circuits will be described. The circuit for row one includes a P-type MOS transistorr $Q_{Aa}$, a resistor $R_A$ connected between the drain electrode of the transistor and ground, and a fuse $F_A$ connected between the drain electrode and a terminal to which a negative voltage —V may be applie. The drain electrode is also connected to one input terminal 26 of a NOR gate $G_A$. The other input terminal 28 of the NOR gate $G_A$ connectes to an inverter $I_B$.

The output terminal 30 of the NOR gate $G_A$ is connected to the top row conductor and is connected also to one source/drain electrode of a bi-directional, transmission-gate transistor $Q_{Ac}$. The other source/drain electrode of this transistor is connected to the gate electrode of a P-type transistor $Q_{Bb}$ and through a capacitor $C_B$ to ground. The source electrode of transistor $Q_{Bb}$ is connecte to ground and the drain electrode is connected to the source electrode of a second P-type transistor $Q_{Ba}$. The drain electrode of transistor $Q_{Ba}$ is connected to the common terminal which leads to fusible link $F_B$, resistor $R_B$, NOR gate $G_B$ and inverter $I_B$.

The columns of the memory are connected to a comparator 34 shown at the lower part of the figure. This circuit includes a plurality of P-type bi-directional MOS transistors $Q_1$, $Q_2$ . . . $Q_m$. These transistors are connected at one electrode to the respective columns of the memory, and at another electrode to a common lead 12 via a delay means 37. The gate electrodes of the transistors are connected to the output terminals of an m-stage binary counter 14.

The write-in command consists of a negative-going pulse 16 shown at the lower left of the figure. It is applied via a common conductor 18 to the gate electrodes of transistors $Q_{Aa}$, $Q_{Ba}$ . . . $Q_{Na}$. The pulse 16 is also applied via common conductor 12 and delay means 37 to one electrode (which may be considered the drain electrode during this, the write operation) of transistors $Q_1$, $Q_2$ . . . $Q_m$. It is also applied through inverter 20 to the gate electrodes of transistors $Q_{Ac}$, $Q_{Bc}$, $Q_{Cc}$ and so on.

When it is desired to write information into the memory, a source of voltage —V is applied to the various terminals so legended in the figure. Then, serially-occurring pulses are applied to input terminal 21 of counter 14 (the counter initially is in its reset condition), to cause a binary number, manifested as voltages appearing at the output leads 22–1 . . . 22–N, to be stored in the counter. Alternatively, after the source of voltage —V is applied, the parallel-load terminals 23 can be used to insert the desired binary number in parallel into the counter.

For purposes of the explanation which follows, the convention is adopted that a number which is equal to the number it is desired to store in a row of the memory is placed in the binary counter, that the storage of the bit 1 is to be manifested in the memory by a burned-out fuse and that the storage of the bit 0 is to be manifested by the presence of a fuse. Also, as already stated, the bit 1 is represented by a negative voltage —V and the bit 0 by ground.

When the write-in command, a negative pulse, is applied to terminal 24, transistor $Q_{Aa}$, which may be considered a switch, conducts an amount of current sufficient to burn out fuse $F_A$. As soon as the fuse burns out, the switch opens, that is, transistor $Q_{Aa}$ stops conducting. It does this because its source and drain electrodes are both at ground. When this occurs, input lead 26 to NOR gate $G_A$ assumes ground potential so that a binary 0 rather than a 1 may be considered to be present on lead 26. The second input lead 28 to NOR gate $G_A$ is connected through inverter $I_B$ and fuse $F_B$ to a source of negative voltage —V, indicative of binary 1. Thus, the inverter $I_B$ applies a voltage indicative of the bit 0 to lead 28. The NOR gate therefore becomes enabled and applies a signal indicative of a binary 1, a negative voltage —V, to control-line 30 (Row 1).

As mentioned above, the write command 16 is applied to the switches for all rows. It passes through switch $Q_{Aa}$ and then opens this switch. However, it has no effect on the remaining switches at this time. For example, the following switch consists of transistors $Q_{Ba}$ and $Q_{Bb}$ connected in series. The negative pulse 16 forward biases transistor $Q_{Ba}$. However, capacitor $C_B$ is not charged and is prevented from becoming charged by transistor $Q_{Ac}$. The latter is cut-off by the positive-going pulse applied thereto by inverter 20. As capacitor $C_B$ is not charged, transistor $Q_{Bb}$ is cut-off and does not permit current flow through the series circuit consisting of the source-to-drain paths of transistors $Q_{Ba}$ and $Q_{Bb}$.

Returning to row 1, the negative voltage at 30 forward biases all of the transistors $Q_{A1}$ . . . $Q_{Am}$ in this row. These transistors therefore all conduct current through their load resistors $R_1$, $R_2$, etc., but, as the load resistors are of relatively large value, this current is not appreciable and is certainly not sufficient to burn out a fuse such as 32. However, the comparator 34 may include one or more transistors which are conducting. For example, if the lead 22–1 is carrying a negative voltage —V representing storage of the bit 1, then transistor $Q_1$ conducts and it conducts sufficient current from ground through transistor $Q_{A1}$ and through transistor $Q_1$ to common lead 12 to burn out the fuse 32. The burned-out fuse now represents storage of the bit 1. On the other hand, some of the transistors $Q_1$ . . . $Q_m$ may have their gate electrodes at ground potential, representing the bit 0, and these transistors will not conduct. If transistor $Q_2$ is such a transistor, then insufficient current will flow through fuse 34 in row 1, column 2 to burn out fuse 34. This fuse therefore will represent storage of the bit 0.

It may be desired to write information into one or more of the other rows in the memory. This may be accomplished in a manner similar to that discussed above. The *m*-stage binary counter is set to the count it is desired to read into a row as, for example, row 2. Then the write-command pulse 16, which was terminated after row 1 was written, is again produced. When this occurs, the transistor $Q_{Aa}$ is not driven into conduction since both its source and drain electrodes are connected to ground. However, the switch transistors in the following row are driven into conduction for reasons given below.

Returning for a moment to the write-in of information into row 1, when a 1 (negative voltage —V) is produced at lead 30, transistor $Q_{Ac}$ is cut-off in view of the reverse bias, a positive-going pulse, applied to this transistor via inverter 20. However, as soon as the write-pulse 16 terminates, the inverter 20 applies a negative voltage to the gate electrode of transistor $Q_{Ac}$ forward biasing this transistor. Now the transistor $Q_{Ac}$ does conduct, because its "drain" electrode connected to lead 30 is negative to the extent of —V volts and its "source" electrode is connected through capacitor $C_B$ to ground. The current conducted through transistor $Q_{Ac}$ charges capacitor $C_B$ to an extent such that trasnistor $Q_{Bb}$ becomes forward biased (the gate electrode of transistor $Q_{Bb}$ is driven negative). In view of the extremely high impedance between the gate and source electrode of transistor $Q_{Bb}$, capacitor $C_B$ does not discharge through this path and transistor $Q_{Bb}$ remains forward biased.

When the second write-in command 16 is generated, it forward biases trannistor $Q_{Ba}$ and, as transistor $Q_{Bb}$ is now also froward biased, current flows through these two transistors to fuse $F_B$. This fuse burns out and the bit on lead 36 changes from 1 to 0. The bit present on lead 38 is also 0 so that NOR gate $G_B$ is enabled and the word stored in the counter 14 is written into row 2. The delay element 37 in line 12 prevents the comparator transistors 34 from burning out row fuses until the control circuit completes its selection of the proper row.

The process described above may be repeated for as many times as there are rows in the memory. Each time a new write-in command 16 appears, a fuse in the control circuit for the next row in the memory is burned out. This causes the NOR gate for that row to become enabled, the transistors in that row of the memory to become forward biased, and the word stored in the counter to be written into that row. The burned-out fuse in the control circuit also automatically permanently disables the NOR gate for the preceding row. It does this since the inverter for the selected row applies a signal indicative of the bit 1 to an input lead of the NOR gate in the preceding row. Finally, each time a row of the memory is selected, the switch means (the transistor $Q_{Aa}$ or the transistor pair such as $Q_{Ba}$, $Q_{Bb}$) for that row is opened and the switch means for the following row is "primed," that is, is placed in condition to be closed.

In one particular use for the memory shown, that of measuring time, it is desired only to read out the last row of information which has been written into the memory. The control circuit shown permits this to be done. In this particular application, after the memory has been written into, the counter is reset to 0 and the various voltages —V are removed so that the information may be stored for a long period of time without the use of any power.

In operation, when it is desired to start measuring time, the voltage —V is applied to the various terminals so legended and concurrently a fixed frequency oscillator (not shown) starts applying pulses to input terminal 21. Also terminal 24 is grounded.

In response to the voltage —V, only the last row of the memory which was written into will become actuated. For example, if row 2 is the last one which was written into, fuse $F_B$ is burned out but fuse $F_C$ for the third row remains intact. Therefore, lead 36 for NOR gate $G_B$ is grounded and this represents the bit 0. A voltage —V indicative of the bit 1 is applied through fuse $F_C$ to inverter $I_C$ so that a signal indicative of the bit 0 appears on lead 38. Thus, gate $G_B$ becomes enabled and the transistors $Q_{B1}$ . . . $Q_{Bm}$ are forward biased. The remaining rows 1, 3 . . . N are all disabled as the NOR gates for these rows and, in the limiting case, the inverter $I_N$ for the last row, all produce 0's at their outputs maintaining the transistors of the remaining rows cut-off.

As already mentioned, pulses are applied to lead 21 and the counter 14 counts. When the count reaches the count stored in the last row of the memory written into, the comparator leads 50, 64 and so on all are at ground, representing the bit 0, and the NOR gate 60 becomes actuated and produces a 1 output.

The above may be shown by a number of specific examples. Assume that row 2 is the last one written into and that NOR gate $G_B$ therefore places a forward bias on the gate electrodes of all transistors in that row. Assume also that fuse 48 is intact, representing storage of the bit 0. Assume that lead 22–1 is at ground also representing storage of the bit 0. Transistor $Q_{B1}$ conducts current through fuse 48 and the voltage on column lead 62 is at ground. The electrode of transistor $Q_1$ which is connected to lead 12, which electrode during this—the read operation, is considered the "source" electrode, is at ground and the gate electrode also is at ground so that this transistor does not conduct any appreciable current through its source-to-drain path. Lead 50 remains at ground representing the bit 0 and this is correct since the bit 0 present on the lead 22–1 is equal to the bit 0 represented by the intact fuse 48.

Assume now that fuse 52 is burned out, representing storage of the bit 1. Assume also that lead 22–2 is at —V volts, representing storage of the bit 1. Now transistor $Q_2$ conducts since its "drain" electrode is connected through resistor $R_2$ to the source of negative voltage —V, its "source" electrode is connected to ground and its gate electrode is connected to —V. As current is conducted through transistor $Q_2$, its drain electrode reaches approximately the same potential as its source electrode, namely ground, and lead 64 is at ground. It therefore is clear that when the count in counter 14 is equal to the count stored in the selected row of the memory, all of the "drain" electrodes of the transistors of comparator 34 are at ground and NOR gate 60 becomes enabled and produces an output signal indicative of the bit 1.

If a bit stored in a selected row of the memory is unequal to the bit stored in the corresponding output lead of the counter, then, in one case, a negative voltage appears at the drain electrode of the comparator 34. For example, if a fuse such as 52 is burned out, representing storage of the bit 1, and lead 22–2 is at ground, representing storage of the bit 0, then transistor $Q_2$ does not conduct and lead 64 is negative.

However in the fourth case, if a fuse such as 48 is intact, representing storage of the bit 0, and lead 22–1 is at —V, representing storage of the bit 1, then both transistors $Q_1$ and $Q_{B1}$ conduct and lead 50 is at ground, representing the bit 0. This is inconsistent with the remaining results since, in this case, the stored bit is unequal to the bit with which it is compared and still there is a 0 present on an output lead. However, in practice, this does not affect the circuit operation since all zeros occur on the output leads 50, 64 and so on, for the first time, when the number stored in the counter is exactly equal to the number stored in the memory and this is the only condition of interest.

A specific example will serve to show that this is so. The truth table for operation of a comparator transistor derived in the discussion above is as follows, where: M represents the value of the bit stored in the memory, C represents the value of the corresponding bit stored in the counter and R represents the resulting bit present on the "drain" electrode of the comparator transistor.

| M | C | R |
|---|---|---|
| 0 | 0 | 0 |
| 0 | 1 | 0 |
| 1 | 0 | 1 |
| 1 | 1 | 0 |

Assume now that the word in memory, in the selected row it is desired to read out, is a three-bit word 110. Assume also that the counter starts counting at 000. The truth table below describes the circuit operation. $M_2M_1M_0$ represents the three-bit word in the memory, $C_2C_1C_0$ represents the three-bit word in the counter and $R_2R_1R_0$ represents the three-bit comparison word. Note that 000 appears for the first time only when $M_2M_1M_0=C_2C_1C_0$. It also appears after this, but in this particular application the only thing of interest is the first time NOR gate 60 becomes enabled, that is, the first time $R_2R_1R_0=000$ appears.

| $M_2$ | $M_1$ | $M_0$ | $C_2$ | $C_1$ | $C_0$ | $R_2$ | $R_1$ | $R_0$ |
|---|---|---|---|---|---|---|---|---|
| 1 | 1 | 0 | 0 | 0 | 0 | 1 | 1 | 0 |
| 1 | 1 | 0 | 0 | 0 | 1 | 1 | 1 | 0 |
| 1 | 1 | 0 | 0 | 1 | 0 | 1 | 0 | 0 |
| 1 | 1 | 0 | 0 | 1 | 1 | 1 | 0 | 0 |
| 1 | 1 | 0 | 1 | 0 | 0 | 0 | 1 | 0 |
| 1 | 1 | 0 | 1 | 0 | 1 | 0 | 1 | 0 |
| 1 | 1 | 0 | 1 | 1 | 0 | 0 | 0 | 0 |
| 1 | 1 | 0 | 1 | 1 | 1 | 0 | 0 | 0 |

It is also possible to operate the circuit of the present invention in such a way that any row of the memory can be read out. There are a number of ways this may be done. As one example, switches may be placed in series with each row between the output connection of the NOR gate for that row and the row conductor. These switches may be operated in such a way that a row it is desired to be read out is placed at a negative voltage and all other rows are placed at ground.

What is claimed is:

1. In combination:

a plurality of logic gates;

switch means at the input circuit to each such gate, the switch means for the first such gate being in condition to conduct and the switch means for the remaining gates being disabled;

means coupled to the first logic gate for applying a disabling signal to one input terminal thereof;

means coupled to each succeeding logic gate for applying a disabling signal to one input terminal of that gate and a priming signal to another input terminal of the preceding gate;

means responsive to the presence of a first enabling signal indicative of a bit of given value applied to all of said switch means for removing the disabling signal from said first logic gate thereby enabling the same and for opening the switch means for said first gate;

means responsive to the termination of said enabling signal for priming the switch means for the second logic gate; and means responsive to each following enabling signal, indicative of said bit of given value applied to all of said switch means, for enabling the logic gate for the primed one of said switch means for disabling the preceding logic gate, and opening said primed one of said switch means and, upon termination of said signal, for priming the switch means for the following logic gate.

2. In the combination set forth in claim 1, each means responsive to an enabling signal including a fuse.

3. In the combination set forth in claim 1, each switch means including a transistor, and means responsive to a predetermined amount of current flow through said transistor for disabling said transistor.

4. In the combination set forth in claim 3, each such transistor having a gate electrode, a source electrode and a drain electrode, and wherein said means responsive to a predetermined amount of current flow comprises means for maintaining said source and drain electrodes at a common value of potential.

5. In combination:

a logic circuit;

a source representing a binary digit of one value;

a relatively low impedance fuse connected between said source and an input terminal for said logic circuit;

a source representing a binary digit of the other value;

a relatively high impedance connection between said input terminal of said logic circuit and said source representing said binary digit of other value; and means coupled to said input terminal for supplying sufficient current to burn out said fuse.

6. In the combination set forth in claim 5, said binary digit of one value constituting a disabling signal for said logic circuit and said binary digit of other value a priming signal for said logic circuit, whereby when said fuse is blown, said logic circuit becomes primed.

7. The combination of:

a memory having a plurality of rows;

control circuit means for writing successive words into successive rows of said memory, in response to successive write commands and, after writing information into a row, disabling the input circuit for that row to prevent the write in, at any future time, of additional information to that row; and read circuit means for said memory controlled by said control circuit for automatically addressing solely the last row written into the memory in response to a read command.

8. The combination of:

a memory having a plurality of rows; and control circuit means for writing successive words into successive rows of said memory, in response to successive write commands and, after writing information into a row, disabling the input circuit for that row to prevent the write in, at any future time, of additional information to that row.

References Cited

UNITED STATES PATENTS 3,371,211 2/1968 Onuma et al. --------307—221

OTHER REFERENCES

De Witt, D., et al., "Memory Array," IBM, TDB vol. 10, No. 1, June 1967, p. 95.

Redmond, K., "Low-Cost Transistor Overload Safety Circuit," Electronics, Oct. 14, 1960, p. 102.

BERNARD KONICK, Primary Examiner

J. F. BREIMAYER, Assistant Examiner

U.S. Cl. X.R.

307—202, 304